US005300351A

United States Patent [19]

Takahashi et al.

[11] Patent Number: 5,300,351

[45] Date of Patent: Apr. 5, 1994

[54] HEAT-SENSITIVE HOT-MELT IMAGE TRANSFER SHEET

[75] Inventors: Toshinori Takahashi, Kawasaki; Itsuo Takanashi, Kamakura; Hideshi Tanaka, Yokohama; Hiroki Kitamura, Tokyo; Toru Nibe, Yokosuka; Tadao Shinya; Yutaka Mizoguchi, both of Yokohama; Katsuhiko Terada, Yokosuka, all of Japan; Toshinori Takahashi, Kawasaki; Itsuo Takanashi, Kamakura, all of Japan

[73] Assignee: Victor Company of Japan, Ltd., Yokohama, Japan

[21] Appl. No.: 931,457

[22] Filed: Aug. 21, 1992

Related U.S. Application Data

[63] Continuation of Ser. No. 700,879, May 10, 1991, abandoned, which is a continuation of Ser. No. 409,184, Sep. 19, 1989, abandoned.

[30] Foreign Application Priority Data

Sep. 20, 1988 [JP] Japan ............................... 63-235406

[51] Int. Cl.$^5$ ............................................. B32B 9/00

[52] U.S. Cl. .................................. 428/207; 428/156; 428/195; 428/212; 428/409; 428/411.1; 428/913

[58] Field of Search ............ 428/156, 195, 207, 411.1, 428/484, 913, 336, 409, 212

[56] References Cited

U.S. PATENT DOCUMENTS

| | | | |
|---|---|---|---|
| 4,250,511 | 2/1981 | Stein et al. | 346/76 PH |
| 4,873,134 | 10/1989 | Fulton et al. | 428/156 |

FOREIGN PATENT DOCUMENTS

| | | | |
|---|---|---|---|
| 58-212993 | 12/1983 | Japan | 428/195 |
| 59-207285 | 11/1984 | Japan | 428/195 |
| 60-192692 | 10/1985 | Japan | 428/195 |
| 62-83186 | 4/1987 | Japan | 428/195 |

*Primary Examiner*—Patrick J. Ryan
*Assistant Examiner*—William A. Krynski
*Attorney, Agent, or Firm*—Pollock, Vande Sande & Priddy

[57] ABSTRACT

A heat-sensitive hot-melt image transfer sheet transfers an ink image to a recording sheet when selectively heated by the heating element of the thermal head of a thermal printer. The image transfer sheet comprises a base coated on a surface thereof with a matrix of circular hot-melt ink dots at a constant pitch. The hot-melt ink dots are selectively meltable with heat applied through the base by the heating elements for transferring an ink image to the recording sheet held against the matrix of hot-melt ink dots.

4 Claims, 2 Drawing Sheets

HEAT-SENSITIVE HOT-MELT IMAGE TRANSFER SHEET

This application is a continuation of Ser. No. 700,879, filed on May 10, 1991, is now abandoned, which is a continuation of Ser. No. 07/409,184 filed on Sep. 19, 1989, is now abandoned.

BACKGROUND OF THE INVENTION

1. Field of the Invention

The present invention relates to a heat-sensitive hot-melt image transfer sheet for use in a thermal printer.

2. Prior Art

There are known various heat-sensitive hot-melt image transfer sheets for use in thermal printers. One conventional heat-sensitive hot-melt image transfer sheet comprises a base of polyester having a thickness ranging from 3 μm to 9 μm and a layer of hot-melt ink coated uniformly on one surface of the base. In use, the heat-sensitive hot-melt image transfer sheet is set in a thermal printer while the hot-melt ink layer is being held in contact with an image recording sheet and the reverse side of the image transfer sheet is in contact with the thermal head of the printer. Then, an electric current representative of an image to be transferred is supplied to the thermal head to heat the same. The hot-melt ink is thus melted in a selected pattern such as characters or a graphic figure by the heat of the thermal head, and the melted ink pattern is transferred to the image recording sheet.

When a colored image is to be recorded on a recording sheet by a thermal printer, there is employed a heat-sensitive hot-melt image transfer sheet which comprises a base coated with full-page patterns of hot-melt inks of different colors such as yellow, magenta, cyan, and black. The hot-melt inks are successively melted by the thermal head in selected image patterns which are transferred overlappingly onto the recording sheet, thus producing a colored image thereon.

The electric current or currents supplied to the thermal head to record a desired monochromatic or colored image are varied to vary the amount of the melted ink or the amounts of melted inks, so that the area or areas in which the hot-melt ink or inks are transferred to the recording sheet are controlled to achieve a desired gradation of density of the recorded image.

If the density of a portion of an image to be recorded is low, then the level of the electric current fed to the thermal head to reproduce the density is also low. Therefore, the heat applied by the thermal head to the hot-melt ink corresponding to that image portion is absorbed by the surrounding hot-met ink, reducing the region in which the hot-melt ink is actually melted, so that the hot-melt ink will not be sufficiently transferred from the base of the image transfer sheet. As a result, dots formed on the recording sheet by the transferred hot-melt ink may lack portions thereof or become irregular in shape. When the hot-melt ink is heated to a lower temperature, its viscosity remains higher, making it difficult for an intended quantity of hot-melt ink to be separated from the image transfer sheet base.

Conversely, if the density of an image portion to be recorded is high, then the level of the supplied electric current to accomplish the density is also high. The hot-melt ink may then be melted and transferred excessively, with the result that adjacent ink dots on the recording sheet may be joined to or combined with each other. When the hot-melt ink is heated to a higher temperature, its viscosity becomes lower, with the result that surrounding areas of hot-melt ink as well an intended area thereof will be separated from the image transfer sheet base. Thus, an excessive amount of hot-melt ink tends to be supplied from the image transfer sheet.

When the hot-melt ink or inks are hot melted and transferred in a desired amount or amounts, the area or areas on the recording medium in which the melted ink or inks are present tend to vary from a desired size or sizes. Then, the gradations of density of the image to be recorded cannot accurately be controlled, the image cannot sharply be recorded, and, if the image is colored, the desired colors cannot be reproduced exactly.

The ink or inks of the conventional heat-sensitive hot-melt image transfer sheets are coated uniformly on the entire surface of their bases. A special ink coat applicator has heretofore been required in the production of the heat-sensitive hot-melt image transfer sheets. It has been difficult and costly to manufacture the heat-sensitive hot-melt image transfer sheets.

SUMMARY OF THE INVENTION

In view of the aforesaid drawbacks of the conventional heat-sensitive hot-melt image transfer sheets, it is an object of the present invention to provide a heat-sensitive hot-melt image transfer sheet which makes it possible to record sharper images to be recorded on a recording sheet, and can be manufactured easily and inexpensively.

According to the present invention, there is provided a heat-sensitive hot-melt image transfer sheet for transferring an image to a recording sheet, comprising a base, and a matrix of hot-melt ink dots coated on a surface of the base at a constant pitch and selectively meltable with heat applied through the base for transferring an ink image to the recording sheet held against the matrix of hot-melt ink dots. The total area of the hot-melt ink dots ranges from 50% to 90% of the total area of the surface of the base. For purposes of definition, a matrix of hot-melt ink dots comprises a plurality of parallel columns hereinafter referred to as columnar arrays.

There is also provided a heat-sensitive hot-melt image transfer sheet for transferring a colored image to a recording sheet, comprising a base, and a plurality of matrices of hot-melt ink dots of different ink colors coated on a surface of the base at a constant pitch and selectively meltable with heat applied through the base for transferring respective ink images to the recording sheet held against the matrices of hot-melt ink dots. The matrices of hot-melt ink dots have corresponding dot columnar arrays inclined at respective different angles to the direction of an array of heating elements of the thermal head of a thermal printer by which the image is recorded on the recording sheet through the heat-sensitive hot-melt image transfer sheet.

The above and other objects, features and advantages of the present invention will become more apparent from the following description when taken in conjunction with the accompanying drawings in which preferred embodiments of the present invention are shown by way of illustrative example.

DETAILED DESCRIPTION

Figure 1:
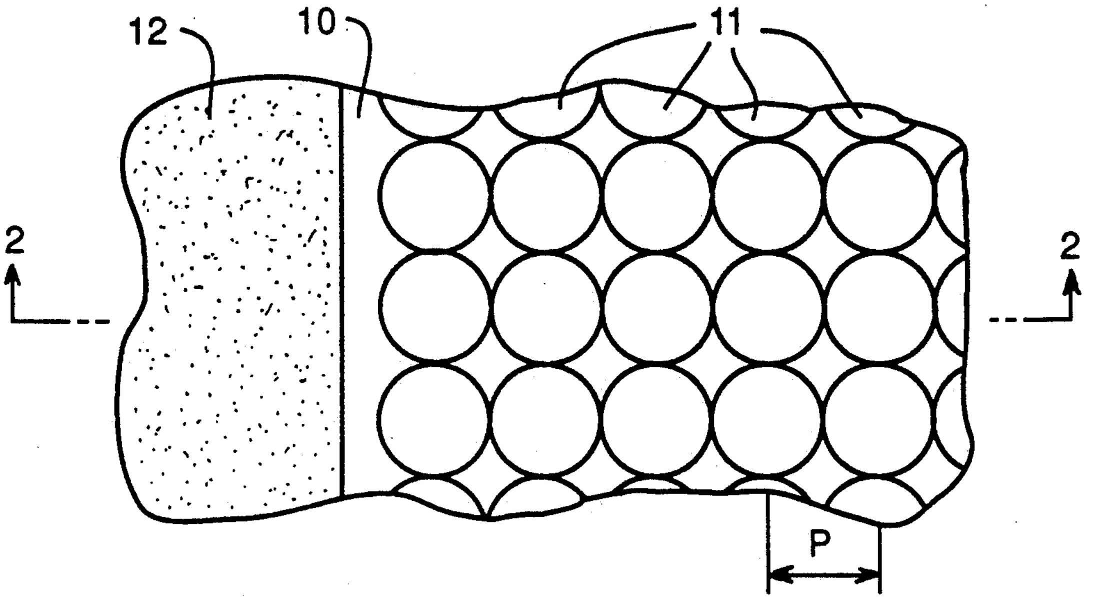
FIG. 1 is an enlarged fragmentary plan view of a heat-sensitive hot-melt image transfer sheet according to the present invention.
Figure 2:
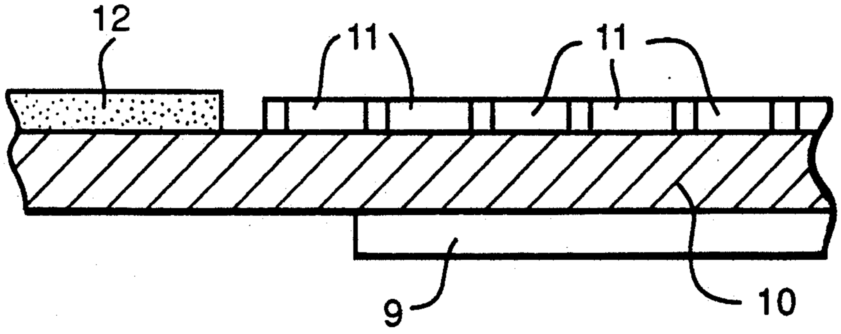
FIG. 2 is a cross-sectional view taken along line II—II of FIG. 1.

As shown in FIGS. 1 and 2, a heat-sensitive hot-melt image transfer sheet according to an embodiment of the present invention comprises a base 10 in the form of a polyester film which is coated on one surface thereof with a matrix of dots 11 of hot-melt ink of polyester, the dots 11 having a substantially uniform thickness ranging from about 1.5 μm to 3.5 μm. The hot-melt ink dots 11 are selectively meltable with heat applied through the base 10 from the heating elements of the thermal head 9 of a thermal printer.

The hot-melt ink dots 11 are each circular in shape as shown in FIG. 1, and adjacent ones of these hot-melt ink dots 11 are held in contact with each other at their circumferential edges. The center-to-center pitch or interval P between adjacent ones of the dots 11 is smaller than the pitch of an array of heating elements of the thermal head of a thermal printer in which the heat-sensitive hot-melt image transfer sheet will be used. The heating elements of the thermal head are usually arranged at a density of 6 to 12 dots/mm. If the pitch P of the dots 11 were equal to the pitch of the heating elements of the thermal head, then a moiré pattern would tend to be produced in a recorded image.

When a high-density portion of an image is recorded on a recording sheet (not shown) using the heat-sensitive hot-melt image transfer sheet, since the adjacent hot-melt ink dots 11 are formed independently of each other, the melted ink dots 11 are less liable to be attracted to and combined with each other. Accordingly, the ink dots 11 in the high-density image portion do not adversely affect an adjacent area on the recording sheet.

When a low-density portion of an image is recorded on the recording sheet, the heat applied to the corresponding ink dots 11 is not absorbed by hot-melt ink dots 11 in a non-recording area adjacent to the low-density image portion, and hence the melted ink region is prevented from being reduced. The hot-melt ink dots 11 in the low-density image portion are thus well transferred sufficiently from the heat-sensitive hot-melt image transfer sheet to the recording sheet without lacking portions of these dots 11.

The area in which hot-melt ink dots 11 are to be transferred onto the recording sheet can therefore be controlled accurately. As a consequence, the gradations of density of an image to be recorded can be controlled with accuracy, and the recorded image is high in quality and has sharp edges.

The hot-melt ink dots 11 can be coated on the base 10 by a conventional printing process such as the offset printing process. The heat-sensitive hot-melt ink dots 11 can be manufactured with ease and at a reduced cost.

Figure 3:
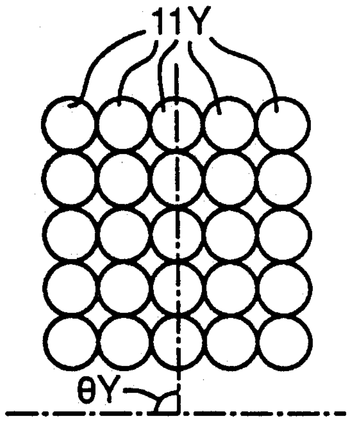
FIGS. 3 through 5 are plan views showing patterns in which hot-melt inks of different colors are coated on a base.
Figure 4:
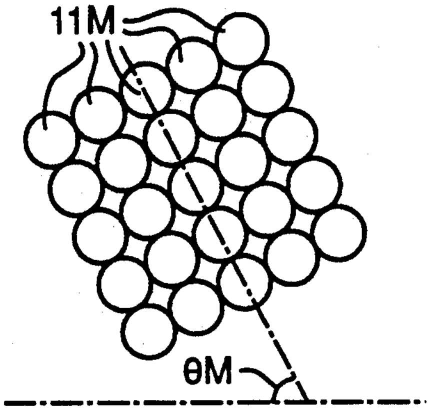
Figure 5:
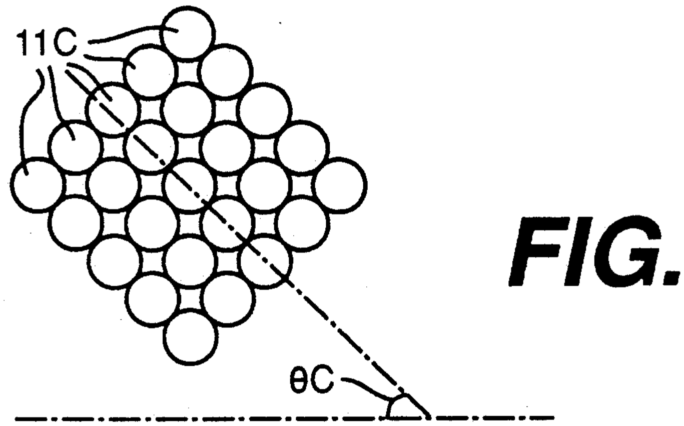

For recording a colored image, as shown in FIGS. 3, 4, and 5, the base 10 is coated with matrices of hot-melt ink dots 11Y, 11M, 11C of different colors such as yellow (Y), magenta (M), and cyan (C), for example. The hot-melt ink dots 11Y, 11M, 11C have corresponding dot columnar arrays inclined at respective angles $\theta Y$, $\theta M$, $\theta C$ with respect to the direction of the array of heating elements of the thermal head or the direction in which the image transfer sheet is fed. The angles $\theta Y$, $\theta M$, $\theta C$ may be 90°, 60°, and 45°, respectively, for example.

With the dot arrays of the hot-melt ink dots 11Y, 11M, 11C of different colors being thus inclined at different angles, an error referred to as a color shift caused when the colors are overlapped is reduced. As a result, the reproducibility of colors is increased, and a periodic moiré pattern is prevented from being formed in the resultant colored image.

As shown in FIG. 1, a binder 12 is coated on a surface of the base 10 at the leading end thereof in front of the hot melt ink dots 11. Before the hot-melt ink dots 11 are selectively transferred to the recording sheet, the binder 12 is applied to the recording sheet as it is placed on the heat-sensitive hot-melt image transfer sheet, so that the surface of the recording sheet can be smoothed. Consequently, even when an image is recorded on a sheet of ordinary paper, the image can well be recorded on the ordinary paper sheet by employing the heat-sensitive hot-melt image transfer sheet.

Figure 6:
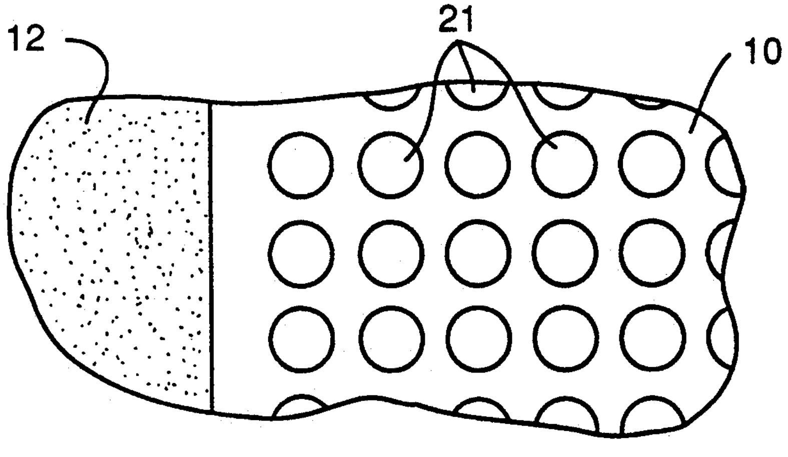
FIG. 6 is an enlarged fragmentary plan view of a heat-sensitive hot-melt image transfer sheet according to another embodiment of the present invention.

FIG. 6 fragmentarily shows a heat-sensitive hot-melt image transfer sheet according to another embodiment of the present invention. According to this embodiment, hot-melt ink dots 21 of circular shape are smaller in size and adjacent dots 21 are held out of contact with each other.

It was experimentally confirmed that the total area occupied by the hot-melt ink dots should preferably be 50% to 90% of the entire area of the base 10. If the total dot area were in excess of 90% of the base area, then the dots would be too closely positioned, i.e., excessively overlapped, and if the total dot area were smaller than 50% of the base area, then the density of recorded images would be too low.

The hot-melt dots may be of other shapes than the circular shape, e.g., they may be square, hexagonal, or lozenged in shape.

Although certain preferred embodiments have been shown and described, it should be understood that many changes and modifications may be made therein without departing from the scope of the appended claims.

What is claimed is:

1. A heat-sensitive hot-melt image transfer sheet having hot-melt ink thereon, for transferring a colored image to a recording sheet with an array of heating elements of a thermal head in a thermal printer, comprising:

a base; and a plurality of matrices of hot-melt ink dots of different ink colors coated on a surface of said base, said plurality of matrices being composed of a plurality of arrays of hot-melt ink dots with a constant center-to-center pitch between adjacent dots which is smaller than the pitch of the heating elements of the thermal head, said hot-melt ink dots being selectively meltable with heat applied by said array of heating element through said base for transferring a color image to the recording sheet held against said matrix of hot-melt ink dots, said hot-melt ink dots having a total area ranging from 50% to 90% of the total area of the surface of said base, each dot array of said plurality of arrays of hot-melt ink dots being inclined at respective different angles to the direction of the array of the heating elements of the thermal printer.

2. A heat-sensitive hot-melt image transfer sheet according to claim 1, wherein each of said hot-melt ink dots is circular in shape.

3. A heat sensitive hot-melt image transfer sheet according to claim 1, wherein said hot-melt ink dots have a thickness ranging from about 1.5 μm to 3.5 μm.

4. A heat-sensitive hot-melt image transfer sheet having a hot-melt ink thereon, for transferring a colored image to a recording sheet with an array of heating elements of a thermal head in a thermal printer, comprising:

a base; and a plurality of matrices of hot-melt ink dots of different ink colors coated on a surface of said base, said plurality of matrices being composed of a plurality of arrays of hot-melt ink dots with a constant center-to-center pitch between adjacent dots which is smaller than the pitch of the heating elements of the thermal head, said hot-melt ink dots being selectively meltable with heat applied by said array of heating elements through said base for transferring a color image to the recording sheet held against said matrix of hot-melt ink dots, said hot-melt ink dots having a total area ranging from 50% to 90% of the total area of the surface of said base, each dot array of said plurality of arrays of hot-melt ink dots being inclined at respective different angles to the direction of the array of the heating elements of the thermal printer;

wherein said different ink colors comprise yellow, magenta, and cyan, and said angles at which the dot arrays of the matrices of the hot-melt ink dots of yellow, magenta, and cyan are inclined are 90°, 60°, and 45°, respectively.

* * * * *